Aug. 10, 1965 E. F. BEEZER 3,199,359
MOTION TRANSMITTING DEVICE
Filed May 1, 1962 2 Sheets-Sheet 1

INVENTOR.
EARL F. BEEZER

BY McGlew and Toren
ATTORNEYS

Aug. 10, 1965                E. F. BEEZER                3,199,359
                        MOTION TRANSMITTING DEVICE
Filed May 1, 1962                                        2 Sheets-Sheet 2
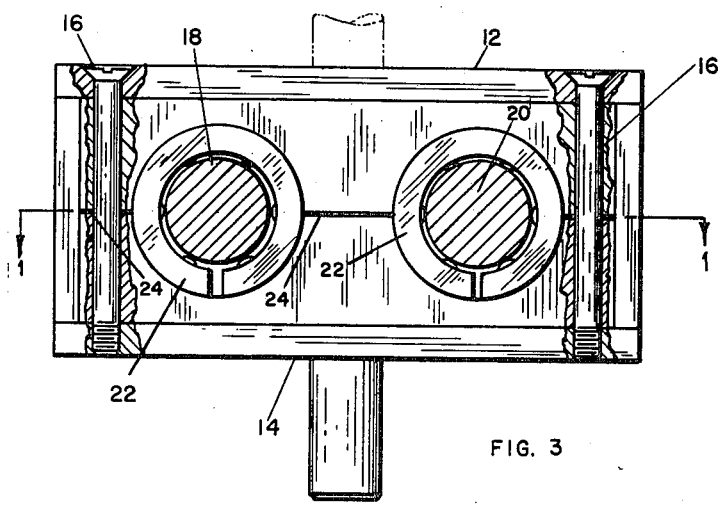
FIG. 3
FIG. 6
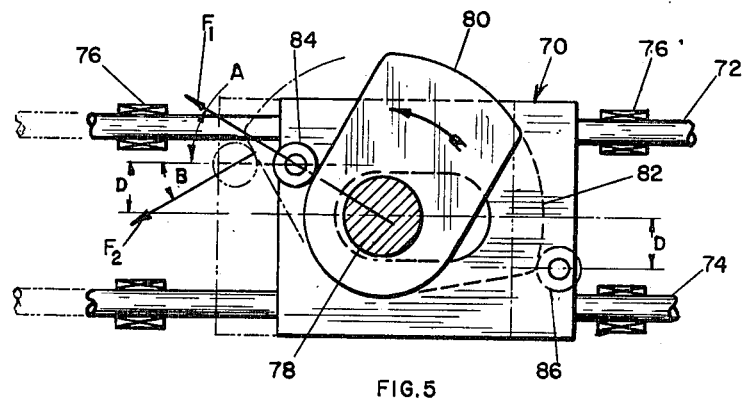
FIG. 5
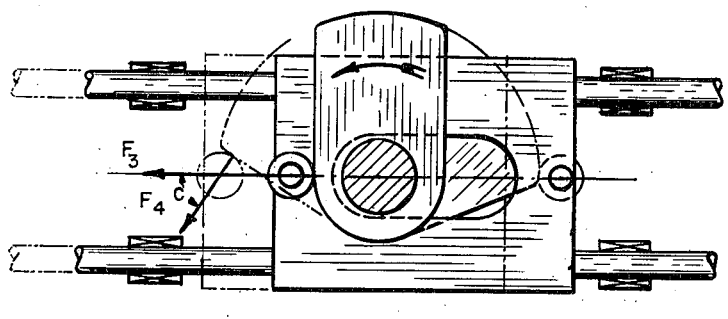
FIG. 4
INVENTOR.
EARL F. BEEZER
BY McGlew and Toren
ATTORNEYS 3,199,359
MOTION TRANSMITTING DEVICE
Earl F. Beezer, 77 Hemlock Drive, Paramus, N.J.
Filed May 1, 1962, Ser. No. 191,575
4 Claims. (Cl. 74—55)

This invention relates in general to motion transmitting devices and in particular to a new and useful device for producing linear motion from a rotary element and/or vice versa.

The present invention is particularly directed toward production of a translatory or linear movement by means of a rotary shaft or similar device. Prior to the present invention, motion of this nature has been accomplished by employing an advancing screw, for example, or using a slide mechanism in which the rotary motion is transmitted through a linkage to a slide which moves back and forth in a guideway. A disadvantage in the use of a screw mechanism is that accurate particular motions cannot be transmitted but only the motion effected by the particular pitch of the screw employed. In the case of the slide type of device there is a great disadvantage in that the parts are subject to rapid wear, due to friction, and, in addition, accurate movement of the translated part cannot be effected because of play or backlash between the members of the slide.

In accordance with the present invention there is provided a device particularly applicable for transmitting a rotary motion of an input shaft into a back and forth or translatory movement of a driven member. In a preferred arrangement the input shaft is advantageously provided with two separate cam members which are arranged for engagement with separate roller follower elements carried on a member to be translated or moved backwardly or forwardly. The cams are made with surfaces which are complementary to each other or of a conjugate configuration so that one effects positive movement of the slide element in one direction with the other permitting such movement, whereas the other cam provides positive movement in the opposite direction with the other permitting such movement. The cams act to permit movement by being in tight association with a roller follower in a retreating direction, thus insuring that the slide is always moved positively and accurately and without play in both directions.

The invention is particularly advantageous in the provision of the cam members for causing the linear movement of the slide member in a selected direction. By such an arrangement it is possible to select a desired cam configuration or curvature which will give any one a desired movement characteristic to the slide member which is actuated. For example: parabolic, cycloidal or any other type cam curve profiles may be employed to achieve the desired motion characteristics.

In a preferred arrangement the cam members for transmitting the motion are arranged at one location on an input shaft member in the cams and preferably also the ends of the cams are closed by a housing to insure that the parts within the housing are kept free of dirt or dust which may cause wear. The housing also advantageously encloses a slide element with the roller followers arranged on each side of the cam members for positively reproducing the motion of the cams as they are rotated. A slide element is advantageously carried on one or more rod members which are mounted in ball bushing bearings in the housing and extend outwardly therefrom for the purpose of carrying an additional element which is to be moved linearly backwardly and forwardly. A feature of the construction is that the rod elements which carry the slide are movable in ball bushing bearings and rolling contact rather than sliding contact is effected through all of the operating parts. A slide member itself which carries the roller followers advantageously includes means for eccentrically mounting the roller followers so that the eccentricity may be adjusted to tightly engage the roller followers on the respective cams without any play being effected between the parts. The means for accomplishing that advantageously includes a set screw which is exposed for adjustment from the exterior of the housing to rotate the roller followers toward and away from engagement with the associated cam element carried by the input shaft. In some instances it is desirable to employ the set screw adjustment for biasing the roller followers into contact with the cam elements in order to pre-load the setting of the roller followers in respect to the cams.

The device permits rotation of the input shaft in either direction and in some instances the motion may be transmitted in an opposite direction, that is from the slide through the roller followers and cams back to the shaft. The arrangement is such that all movements may take place with rolling contact and all rolling surfaces may be hardened and accurately ground for proper alignment. The entire operating mechanism may be housed in a small-sized housing where the operating parts may be maintained free from dust or contamination which would cause wear. The device is such that the mechanism to be moved may be mounted on rod elements which extend from either one side or from both sides of the motion transmitting part housing.

Accordingly, it is an object of this invention to provide an improved motion transmitting device.

A further object of the invention is to provide a motion transmitting device for transmitting rotary motion into linear back and forth motion.

A further object of the invention is to provide a motion transmitting device including a pair of cam elements arranged on a rotating member such as a shaft arranged to contact roller follower elements arranged on each side of the shaft on a slide member.

A further object of the invention is to provide a motion transmitting device including an input shaft having a pair of cams thereon arranged with oppositely extending conjugate cam surfaces and including a transmitting slide member having a roller follower on each side of said shaft in engagement with a respective cam, and housing means enclosing the cam elements and the slide member.

A further object of the invention is to provide an improved motion transmitting mechanism including a pair of cam elements affixed to a shaft for rotation therewith and carrying cam surfaces disposed on opposite sides such as substantially diametrically opposite with complementary or conjugate cam surfaces and including a slide member having roller followers eccentrically mounted to permit adjustment of the followers into contact with a respective cam member on each side of the shaft, and further including a rod carried by the slide member extending outwardly therefrom.

A further object of the invention is to provide a motion transmitting mechanism having cam means for producing a predetermined desired translatory movement of a part in back and forth directions.

A further object of the invention is to provide a motion transmitting mechanism including a housing enclosing a slide member with rod elements mounted for movement in ball bushing bearings of the housing, and means carried by a rotary shaft at the interior of the housing for effecting controlled back and forth movement of the rod elements.

A further object of the invention is to provide a motion transmitting mechanism for transmitting back and forward motion to a slide member, wherein all of the parts move in rolling contact.

A further object of the invention is to provide a mechanism for transmitting motion which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 3 is an end elevation partly in section taken along the line 3—3 of FIG. 1;

FIG. 4 is a plan view of the slide with the roller followers indicated in contact with their associated cams and indicating the near extreme lateral movement of the slide member in dotted lines;

FIG. 5 is a view similar to FIG. 4 of another embodiment of the invention; and

FIG. 6 is a side elevation of a roller bearing stud indicating the stud in an adjusted position in dotted lines.

Figure 1:
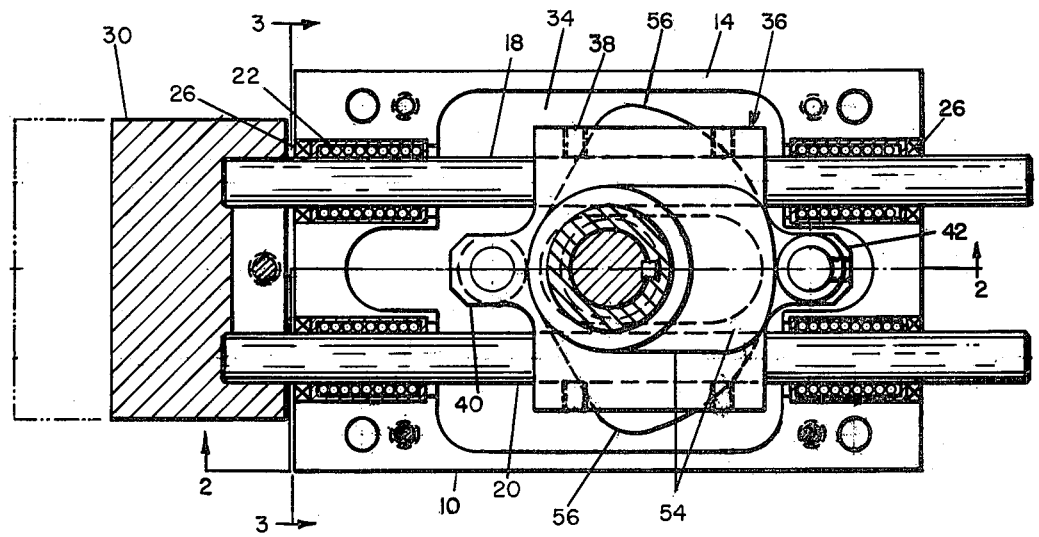
FIG. 1 is a horizontal section taken on the line 1—1 of FIG. 2 of a motion transmission mechanism constructed in accordance with the invention.

Referring to the drawings in particular, the invention embodied therein includes a motion transmitting mechanism comprising a housing generally designated 10 made of split upper and lower parts 12 and 14 which may be assembled together by means of screw elements 16 on each side over a pair of rods 18 and 20 of a slide assembly. A feature of the housing construction is that upper and lower parts 12 and 14 may be assembled around the rods 18 and 20 which are designed for back and forward movement therein. The rods 18 and 20 are held in split ball bushings 22 carried in the housing parts 12, 14, at each end for each rod. The dimensions of the parts 12 and 14 and the bushings 22 are such that they permit adjustment for zero shake of the bushings around the hardened rods 18 and 20 and also permit preloading of the balls to the hardened rods if it is so desired. This adjustment is permitted by providing a small gap 24 between the housing parts 12 and 14. By controlling the housing gap by means of shim, adjusting screw, etc. the ball bushings 22 may be sprung closed by a small amount in order to eliminate all shake or play or to preload balls against the rods 18 and 20, as desired. The housing is also provided with oil seals or packing 26 at each end thereof.

Figure 2:
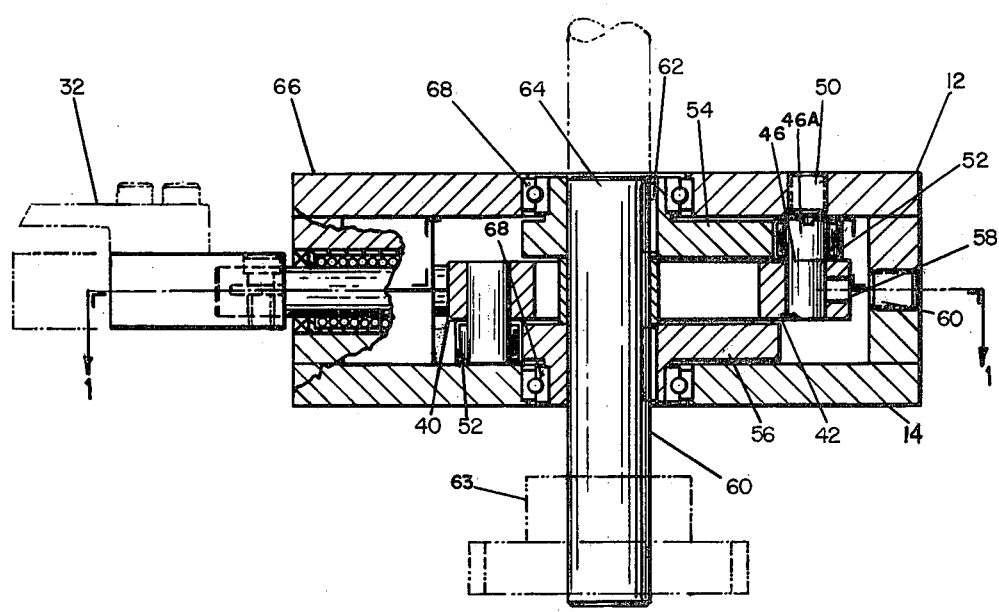
FIG. 2 is a section taken on the line 2—2 of FIG. 1.

In accordance with the invention, one or more rods 18 and 20 may be employed and operated to move backwardly and forwardly. In the embodiment illustrated the rods 18 and 20 carry at their one ends (left end, as indicated in FIGS. 1 and 2) a machine carriage or tool plate 30 which in the embodiment illustrated carries a tool 32.

In the embodiment illustrated in FIGS. 1 to 4 the housing parts 12 and 14 have a hollow interior forming a slide chamber 34 and are provided with bearing recesses at laterally spaced locations and at each end which carry the split ball bushings 22 and the rods 18 and 20. The rods 18 and 20 are movable in rolling contact with the bearings of the split bearing bushings 22 and they extend out from each end of the housing. Of course, one of the ends of the rods 18 and 20 may be shortened so that they do not extend out of the housing at all. In such an event is it preferable that the rods be supported at spaced axial locations, so that the loads are suitably supported on spaced bearings.

A follower member generally designated 36 is provided with grooved underportions or through holes to permit it to be fitted with respective rods 18 and 20 and it is secured to the associated rods by means of set screws 38.

In the embodiments indicated in FIGS. 1 to 4 the follower member 36 carries extending portions 40 and 42 which accommodate anti-friction rollers 52 which are rotatable in a hardened eccentric stud member 46. Stud 46 is provided with a slot 46a for a screw driver or similar tool which may be operated by removing a cap 50 from the housing to rotate the stud and change the position thereof. The position of a roller 52 carried at the outer end thereof and eccentric to inner end is shifted toward or away from contact with an associated cam 54 or 56. After the stud 46 is rotated to the adjusted position it is locked in this position by means of a set screw 58 which is accessible through a cap opening 60 on each side of the housing.

In accordance with the invention the cam members 54 and 56 are secured to a rotating input shaft 60 by means of keys 62. The input shaft 60 is advantageously rotated in either a counterclockwise or clockwise direction by means such as gearing indicated in dotted lines at 63. In the embodiment indicated the shaft is cut off at an end 64 which coincides with the top 66 of the housing. All the bearings 68 are provided at the top and bottom of the housing to support all rotating parts against slide reaction forces and to accommodate hub portions of the respective cams 54, 56 which are affixed to the shaft 60. The mounting on the cam hub is for the purpose of keeping housing size to a minimum as the shaft could be just as easily supported in these bearings.

In the embodiment disclosed, the housing is tightly closed and it is not possible to contaminate the interior with any dirt or dust which would interefere with the operation of the parts.

The device is operated as follows:

The input shaft 60 and the cams 54, 56 secured thereto is arranged so that the cams are positioned adjacent the rollers 52 carried at the end of the stud members 46. Cam 54 is arranged to contact the upper roller and the cam 56 is arranged to contact the lower roller. The cam follower member 36 is secured to the rods 18 and 20 which are positioned in the lower portion of the housing 14 and then the upper portion is assembled thereover and tightened to the lower portion by means of the bolts 16. The roller followers 52 are then adjusted to bear against associated cams 54 and 56 by rotating the studs 46 with the associated eccentric diameter position in order to preferably preload the rollers into contact with the associated cam. In the set position the studs 46 are anchored against rotation by adjusting the set screws 58. The screws 50 and 60 are then replaced and the device is ready for operation.

For clockwise rotation cam 56 is provided with a profile which moves the rods 18 and 20 and the slide member 36 to the left in a positive manner and on its return rotation permits movement of the slide member 36 to the right. The cam 54 on the upper portion of the shaft 60 moves the slide member 36 positively to the right and on its return portion of rotation permits movement thereof to the left. The two rollers 52 in combination are always in contact with their respective cams and prevent any play in the moving parts. The cams are profiled so that a rise portion of one is conjugate to a fall portion of the other, so that motion may be carried out in a uniform and precise manner. The cams 54 and 56 may include any desirable profile shape, for example one that will provide good acceleration or torque characteristics.

In the embodiment indicated the roller followers 52 are indicated along a common center line, however, they may be offset as indicated in the embodiment in FIG. 5. It should be appreciated that a fixed distance between the center of rotation of each of the roller follower elements 52 may be maintained constant, while the cams may be varied to produce a variable function of increment of rise by merely changing the dwell radius of both of the cams. The cams thus permit an infinite variety of motions to be imparted to the cam follower member 36 and the rods 18 and 20.

In FIG. 5 another embodiment of the invention is indicated which includes a member generally designated 70 to which translatory motion is to be imparted which is carried on a pair of spaced rod members 72 and 74. It should be appreciated that while two rod members are indicated a single rod member may be employed which would advantageously be located along the center line. The rod members 72 and 74 are supported in suitable ball bushings 76 at spaced axial locations. The member 70 with the rod members 72 and 74 are shifted backwardly and forwardly by means of a rotating shaft member 78. To produce the shifting movement the shaft member 78 in accordance with the invention is provided with a pair of cams 80 and 82 which are affixed thereto for rotation therewith. Cam 80 is arranged to cooperate with a roller 84 and cam 82 is arranged to operate with a roller 86 each carried by the member 70. In this arrangement the rollers 84 and 86 are carried on the member 70 at positions offset from the center line thereof and offset from each other. Such an arrangement is desirable where it is essential to reduce the pressure angle on the driving portion of the cams 80 and 82. In addition, the arrangement will permit a varying angle of force to minimize the binding on the rods 72 and 74 and the associated ball bushings or bearings. In the position indicated in the drawing of FIG. 5, the normal force on the slide is directed, as indicated by the arrow $F_1$. This force F which acts on the slide roller 84 extends in a direction at an angle A outwardly from the direction of movement of the rods 72 and 74 and the member 70. This is a maximum angle for the low position of the cam and roller. As the shaft 78 rotates in a counterclockwise direction, this angle becomes smaller and at an intermediate position of the roller 84 it is directly in line and then proceeds gradually to the angle B at the other extreme indicated by the direction of the arrow designating force $F_2$. By this arrangement for large increments for rise or fall and with small angular strokes the resultant high pressure angles on the cams and resulting loss of thrust in the direction of motion of the slide rods is minimized as well as any tendency to produce forces which would cause binding of the rods and the member 70 in their movements. This is accomplished by the distribution of the thrust angle on either side of the direction of the center line. In this case conjugate portions of the cams 80 and 82 are not identical with driving portions and must be specially generated. However, the roller followers 84 and 86 are maintained in contact with their respective cam surfaces at all times and the action of one cam in positively moving the member 70 to the left is accompanied by a movement of the other cam in respect to the other roller to permit such movement and vice versa.

Thus the invention provides a motion transmitting mechanism which has many advantages in permitting the movement of the member backwardly and forwardly, such as by the rotation of a shaft.

In the preferred embodiment the members all move with rolling contact and roller bearings are provided for the cam elements in the housing for the rod elements at each end of the housing and also for the individual roller followers. Thus, there are no sliding parts which may rapidly wear by sliding friction. By providing eccentrically mounted roller followers it is possible to take up any play acting on the device and to adjust the roller followers for any small wear which may possibly occur by preloading them in respect to their associated cams. The oil seals which are provided in the surrounding housing insure that foreign matter will be excluded from the parts which require lubrication. The employment of ball bearings for the parts which move the rod members which move backwardly and forwardly it is insured that the apparatus may be adjusted for zero shake, even when the rods are in a worn condition. The apparatus is very versatile and the rod elements may be arranged for extension from one side of the apparatus to the other and the tool carrier may be mounted in a simple manner on the work holder or carrier, as described.

The arrangement of ball bushings and slide rods permits use of large pressure angles on the operating cams 54 and 56, and such an arrangement was impossible heretofore with the use of sliding contact mechanisms.

By the arrangement which permits adjustment of the bushings for zero-shake or preload on the slide rods it is possible to permit the use of a large overhang of the rods outside of the housing.

While specific embodiments of the invention have been shown and described in detail to illustrate the application of the inventive principles, it will be understood that the invention may be embodied otherwise without departing from such principles.

I claim:

1. A motion transmitting device comprising a rotatable shaft, a movable follower member having a slot through which said shaft extends, a first cam member connected to said shaft for rotation therewith on one side of said follower member, a second cam member connected to said shaft for rotation therewith on the opposite side of said movable follower member, a first roller carried by said movable follower member and extending outwardly therefrom in rolling engagement with said first cam, a second follower member extending outwardly from said movable member in rolling engagement with said second cam, a housing including first and second separable portions, each portion defining a rotatable journal for said first and second cams, respectively, said cams being conjugate and of a configuration to permit positive driving of said first roller element with a first characteristic motion by said first cam in one direction while the other roller element is maintained in engagement with its associated cam, and positive driving of said second roller element by said second cam with a second characteristic motion distinct from said first characteristic motion in an opposite direction with the other roller element in engagement with its associated cam, a first rod member connected to said movable member and extending outwardly from at least one end of said housing for connecting said rod member to a device to be moved, a second rod member connected to said movable member and located on the opposite side of said shaft from said first rod member and extending outwardly from said housing for connection to a device to be moved, and roller bearing means in said housing adjacent each end thereof for each of said rod members permitting linear movement of said rod members in axial directions.

2. A device according to claim 1, wherein said first and second rollers are mounted on an eccentric member which is rotatably carried on said movable member, said housing having access means for permitting rotation of said eccentric member and shifting of said roller in respect to its respective cam.

3. A mechanism for moving a member backwardly andn forwardly by employing a rotary element such as a rotatable shaft, comprising first and second cam members adapted to be affixed to said shaft for rotation therewith, a movable follower member having first and second roller elements in engagement with said respective ones of said first and second cams, said roller elements being located on substantially opposite sides on the center of rotation of said cams, a first rod connected to said movable member and extending outwardly therefrom for connection to a device for moving the latter, a second rod connected to said movable member and being substantially parallel to said first rod and located on the opposite side of said movable member from the center of rotation of said cams, said second rod extending outwardly from said movable member for connection to an article to be moved, said cam members being conjugate and of a configuration to permit positive driving of said first roller element with a first characteristic motion by said first cam in one direction while the other roller element is maintained in engagement with its associated cam, and positive driving of said second roller element by said second cam with a second characteristic motion distinct from said first characteristic motion in an opposite direction with the other roller element maintained in engagement with its associated cam, and roller bearing means arranged on at least one side of the center of rotation of said cams for guiding said rods for linear axial movement, said roller bearing means including split ball bushings having ball bearings aligned in respect to the rod for linear movement of said rod, and means for adjusting the loading of said ball bearings in respect to said rods including split housing members having a bore for accommodating the bearings.

4. A mechanism for moving a member backwardly and forwardly by employing a rotary element such as a rotatable shaft, comprising first and second cam members adapted to be affixed to said shaft for rotation therewith, a movable follower member having first and second roller elements in engagement with said respective ones of said first and second cams, said roller elements being located on substantially opposite sides on the center of rotation of said cams, a first rod connected to said movable member and extending outwardly therefrom for connection to a device for moving the latter, said cam members being conjugate and of a configuration to permit positive driving of said first roller element with a first characteristic motion by said first cam in one direction, while the other roller element is maintained in engagement with its associated cam, positive driving of said second roller element by said second cam with a second characteristic motion distinct from said first characteristic motion in an opposite direction with the other roller element maintained in engagement with its associated cam, roller bearing means arrangned on at least one side of the center of rotation of said cams for guiding said rod for linear axial movement including split ball bushings having ball bearings aligned in respect to the rod for linear movement of said rod, and means for adjusting the loading on said ball bearings in respect to said rod including split housing members having a bore for accommodating the bearings.

References Cited by the Examiner
UNITED STATES PATENTS

| | | | |
|---|---|---|---|
| 124,036 | 2/72 | Cockran | 74—55 |
| 216,089 | 6/79 | Herbert et al. | 74—55 |
| 324,784 | 8/85 | Pinkham | 74—55 X |
| 544,380 | 8/95 | Roberts | 74—55 |
| 629,039 | 7/99 | Luitwieler et al. | 74—55 |
| 874,931 | 12/07 | Brenner | 74—55 |
| 1,050,226 | 1/13 | Nixon | 74—55 |
| 1,108,844 | 8/14 | Jacobs | 74—55 |
| 1,748,443 | 2/30 | Dawson | 74—55 |
| 1,978,736 | 10/34 | Bommer | 74—55 |
| 2,006,498 | 7/35 | Dasset | 74—55 |
| 2,249,951 | 7/41 | Fulton. | |
| 2,316,408 | 4/43 | Dawson | 74—55 |
| 2,345,383 | 3/44 | Curtis | 74—50 |
| 2,532,320 | 12/50 | Maussnest | 74—55 X |
| 2,611,847 | 9/52 | Scott | 74—569 |
| 2,677,966 | 5/54 | Mueller | 74—55 |
| 2,770,508 | 11/56 | Smith | 74—569 X |
| 3,022,373 | 2/62 | Levine et al. | 74—55 X |

FOREIGN PATENTS

| | | |
|---|---|---|
| 217,262 | 2/61 | Austria. |
| 874,121 | 7/42 | France. |
| 611,947 | 10/60 | Italy. |

BROUGHTON G. DURHAM, *Primary Examiner.*